US007366893B2

(12) United States Patent
Tindal et al.

(10) Patent No.: US 7,366,893 B2
(45) Date of Patent: Apr. 29, 2008

(54) METHOD AND APPARATUS FOR PROTECTING A NETWORK FROM ATTACK

(75) Inventors: Glen D. Tindal, Colorado Springs, CO (US); Jeffery A. Schenk, Cambria, CA (US)

(73) Assignee: Intelliden, Inc., Colorado Springs, CO (US)

( * ) Notice: Subject to any disclaimer, the term of this patent is extended or adjusted under 35 U.S.C. 154(b) by 762 days.

(21) Appl. No.: 10/213,949

(22) Filed: Aug. 7, 2002

(65) Prior Publication Data

US 2004/0030923 A1    Feb. 12, 2004

(51) Int. Cl.
    *H04L 9/00*    (2006.01)
(52) U.S. Cl. ........................ 713/153; 713/100
(58) Field of Classification Search ............... 726/15, 726/6, 14; 713/153, 150, 100
    See application file for complete search history.

(56) References Cited

U.S. PATENT DOCUMENTS

| | | |
|---|---|---|
| 4,991,089 A | 2/1991 | Shorter |
| 5,109,486 A | 4/1992 | Seymour |
| 5,159,685 A | 10/1992 | Kung |
| 5,442,791 A | 8/1995 | Wrabetz et al. |
| 5,475,819 A | 12/1995 | Miller et al. |
| 5,491,820 A | 2/1996 | Belove et al. |
| 5,506,966 A | 4/1996 | Ban |
| 5,519,704 A | 5/1996 | Farinacci et al. |
| 5,535,335 A | 7/1996 | Cox |
| 5,557,748 A | 9/1996 | Noris |
| 5,581,764 A | 12/1996 | Fitzgerald et al. |
| 5,659,746 A | 8/1997 | Bankert |
| 5,680,551 A | 10/1997 | Martino |
| 5,724,509 A | 3/1998 | Starkweather et al. |
| 5,726,883 A | 3/1998 | Levine et al. |
| 5,751,965 A | 5/1998 | Mayo |
| 5,751,967 A | 5/1998 | Raab et al. |
| 5,764,955 A | 6/1998 | Doolan |
| 5,784,702 A | 7/1998 | Greenstein et al. |
| 5,787,246 A | 7/1998 | Lichtman et al. |

(Continued)

FOREIGN PATENT DOCUMENTS

EP    0 384 339 A2    8/1990

(Continued)

OTHER PUBLICATIONS

Managing Managed Network Services: The Service Provider Blind Spot; Infonetics Research, The Networking Information Source; Jun. 2000 (18 pages).

(Continued)

*Primary Examiner*—Ellen Tran
(74) *Attorney, Agent, or Firm*—Cooley Godward Kronish LLP

(57) ABSTRACT

A method and apparatus to initializing a network device is described. In one embodiment, the present invention includes the step of: retrieving an initial communications address from a local memory of the network device; transmitting a secure identifier to the initial communications address verifying the authenticity of the secure identifier; retrieving a configuration record from a configuration record repository, the retrieved configuration record being associated with the network device that corresponds to the secure identifier; receiving the configuration record at the network device; and installing the configuration record at the network device.

7 Claims, 7 Drawing Sheets

U.S. PATENT DOCUMENTS

| | | |
|---|---|---|
| 5,796,732 A | 8/1998 | Mazzola et al. |
| 5,812,768 A | 9/1998 | Page |
| 5,819,028 A | 10/1998 | Manghirmalani et al. |
| 5,819,042 A | 10/1998 | Hansen |
| 5,832,503 A | 11/1998 | Malik et al. |
| 5,838,918 A | 11/1998 | Prager et al. |
| 5,842,040 A | 11/1998 | Hughes et al. |
| 5,852,740 A | 12/1998 | Estes |
| 5,872,928 A | 2/1999 | Lewis et al. |
| 5,878,432 A | 3/1999 | Misheski |
| 5,884,028 A | 3/1999 | Kindell et al. |
| 5,889,943 A | 3/1999 | Ji |
| 5,889,953 A | 3/1999 | Thebart et al. |
| 5,901,320 A | 5/1999 | Takahashi |
| 5,920,701 A | 7/1999 | Miller et al. |
| 5,923,850 A | 7/1999 | Barroux |
| 5,944,782 A | 8/1999 | Noble et al. |
| 5,948,065 A | 9/1999 | Eilert et al. |
| 5,956,341 A | 9/1999 | Galand et al. |
| 5,961,594 A | 10/1999 | Bouvier et al. |
| 5,968,122 A | 10/1999 | Schlosser et al. |
| 5,968,176 A | 10/1999 | Nessett et al. |
| 5,974,236 A | 10/1999 | Sherman |
| 5,980,078 A | 11/1999 | Krivoshein et al. |
| 5,999,948 A | 12/1999 | Nelson |
| 6,006,035 A | 12/1999 | Nabahi |
| 6,014,697 A | 1/2000 | Lewis |
| 6,016,306 A | 1/2000 | Le Boudec et al. |
| 6,023,586 A | 2/2000 | Gaisford et al. |
| 6,028,846 A | 2/2000 | Cain |
| 6,041,347 A | 3/2000 | Harsham et al. |
| 6,049,828 A | 4/2000 | Dev et al. |
| 6,055,568 A | 4/2000 | Adams |
| 6,085,253 A | 7/2000 | Blackwell |
| 6,088,804 A | 7/2000 | Hill |
| 6,097,697 A | 8/2000 | Yao et al. |
| 6,098,094 A | 8/2000 | Barnhouse et al. |
| 6,098,101 A | 8/2000 | Sears |
| 6,098,108 A | 8/2000 | Sridhar et al. |
| 6,101,508 A | 8/2000 | Wolff |
| 6,104,700 A | 8/2000 | Haddock et al. |
| 6,105,069 A | 8/2000 | Franklin et al. |
| 6,108,699 A | 8/2000 | Moiin |
| 6,108,703 A | 8/2000 | Leighton et al. |
| 6,122,664 A | 9/2000 | Boukobza et al. |
| 6,128,729 A | 10/2000 | Kimball et al. |
| 6,131,118 A | 10/2000 | Stupek, Jr. et al. |
| 6,131,119 A | 10/2000 | Fujii |
| 6,154,776 A | 11/2000 | Martin |
| 6,167,445 A | 12/2000 | Gai et al. |
| 6,170,009 B1 | 1/2001 | Mandal et al. |
| 6,170,011 B1 | 1/2001 | Macleod Beck et al. |
| 6,173,312 B1 | 1/2001 | Atarashi |
| 6,182,094 B1 | 1/2001 | Humpleman et al. |
| 6,198,479 B1 | 3/2001 | Humpleman et al. |
| 6,202,090 B1 | 3/2001 | Simone |
| 6,211,877 B1 | 4/2001 | Steele |
| 6,226,654 B1 | 5/2001 | Van Hoff |
| 6,240,458 B1 | 5/2001 | Gilbertson |
| 6,243,747 B1 | 6/2001 | Lewis et al. |
| 6,243,815 B1 | 6/2001 | Antur |
| 6,247,049 B1 | 6/2001 | Scott |
| 6,253,240 B1 | 6/2001 | Axberg |
| 6,260,072 B1 | 7/2001 | Rodriguez-Moral |
| 6,269,398 B1 | 7/2001 | Leong et al. |
| 6,272,526 B1 | 8/2001 | Robinson |
| 6,286,038 B1 | 9/2001 | Reichmeyer |
| 6,292,889 B1 | 9/2001 | Fitzgerald et al. |
| 6,338,149 B1 | 1/2002 | Ciccone |
| 6,349,306 B1 | 2/2002 | Malik et al. |
| 6,356,955 B1 | 3/2002 | Hollberg et al. |
| 6,363,411 B1 | 3/2002 | Dugan et al. |
| 6,363,421 B2 | 3/2002 | Barker |
| 6,370,119 B1 | 4/2002 | Basso et al. |
| 6,374,293 B1 | 4/2002 | Dev |
| 6,381,631 B1 | 4/2002 | Van Hoff |
| 6,393,425 B1 | 5/2002 | Kelly |
| 6,418,468 B1 | 7/2002 | Ahlstrom et al. |
| 6,426,959 B1 | 7/2002 | Jacobson |
| 6,438,594 B1 | 8/2002 | Bowman-Amuah |
| 6,442,608 B1 | 8/2002 | Knight et al. |
| 6,449,638 B1 | 9/2002 | Wecker et al. |
| 6,449,646 B1 | 9/2002 | Sikora |
| 6,453,255 B1 | 9/2002 | Smorodinsky |
| 6,463,583 B1 | 10/2002 | Hammond |
| 6,466,580 B1 | 10/2002 | Leung |
| 6,470,453 B1 | 10/2002 | Vilhuber |
| 6,473,775 B1 | 10/2002 | Kusters |
| 6,496,843 B1 | 12/2002 | Getchius et al. |
| 6,496,858 B1 | 12/2002 | Frailong |
| 6,539,425 B1 | 3/2003 | Stevens et al. |
| 6,546,416 B1 | 4/2003 | Kirsch |
| 6,550,060 B1 | 4/2003 | Hammond |
| 6,564,056 B1 * | 5/2003 | Fitzgerald ................ 455/435.1 |
| 6,567,406 B1 | 5/2003 | Skemer |
| 6,571,285 B1 | 5/2003 | Groath |
| 6,598,177 B1 | 7/2003 | Jones |
| 6,609,108 B1 | 8/2003 | Pulliam et al. |
| 6,615,166 B1 | 9/2003 | Guheen et al. |
| 6,615,218 B2 | 9/2003 | Mandal |
| 6,625,590 B1 | 9/2003 | Chen et al. |
| 6,628,304 B2 | 9/2003 | Mitchell |
| 6,636,877 B1 | 10/2003 | Doleac et al. |
| 6,643,289 B1 | 11/2003 | Natanson |
| 6,643,640 B1 | 11/2003 | Getchius et al. |
| 6,654,799 B1 | 11/2003 | Tanaka |
| 6,658,526 B2 | 12/2003 | Nguyen et al. |
| 6,678,370 B1 | 1/2004 | Freebersyser |
| 6,678,827 B1 * | 1/2004 | Rothermel et al. ............ 726/6 |
| 6,684,241 B1 | 1/2004 | Sandick |
| 6,684,244 B1 | 1/2004 | Goldman et al. |
| 6,697,967 B1 | 2/2004 | Robertson |
| 6,725,233 B2 | 4/2004 | Froyd et al. |
| 6,725,262 B1 | 4/2004 | Choquier |
| 6,725,264 B1 | 4/2004 | Christy |
| 6,732,175 B1 | 5/2004 | Abjanic |
| 6,738,910 B1 * | 5/2004 | Genty et al. .................. 726/15 |
| 6,760,761 B1 | 7/2004 | Sciacca |
| 6,760,767 B1 | 7/2004 | Miesbauer |
| 6,766,369 B1 | 7/2004 | Haitsuka |
| 6,769,116 B1 | 7/2004 | Sexton |
| 6,772,206 B1 | 8/2004 | Lowry |
| 6,775,698 B1 | 8/2004 | Simone |
| 6,782,474 B1 * | 8/2004 | Ylonen ....................... 713/162 |
| 6,810,427 B1 | 10/2004 | Cain |
| 6,816,897 B2 | 11/2004 | McGuire |
| 6,826,597 B1 | 11/2004 | Lonnroth et al. |
| 6,832,247 B1 | 12/2004 | Cochran |
| 6,834,298 B1 | 12/2004 | Singer |
| 6,847,994 B1 | 1/2005 | Akimoto |
| 6,865,673 B1 * | 3/2005 | Nessett et al. ............... 713/155 |
| 6,895,431 B1 | 5/2005 | Bero |
| 6,895,588 B1 | 5/2005 | Ruberg |
| 6,907,572 B2 | 6/2005 | Little |
| 6,931,016 B1 * | 8/2005 | Andersson et al. ......... 370/401 |
| 6,931,444 B2 | 8/2005 | Schweitzer |
| 6,938,079 B1 | 8/2005 | Anderson |
| 6,959,332 B1 | 10/2005 | Zavalkovsky |
| 6,978,301 B2 | 12/2005 | Tindal |
| 6,990,591 B1 | 1/2006 | Pearson |
| 7,003,560 B1 | 2/2006 | Mullen |
| 7,016,955 B2 | 3/2006 | Martin |
| 7,127,526 B1 | 10/2006 | Duncan |
| 7,145,871 B2 | 12/2006 | Levy |

| | | | |
|---|---|---|---|
| 2001/0034771 | A1 | 10/2001 | Hutsch |
| 2001/0053991 | A1 | 12/2001 | Bonabeau |
| 2002/0007411 | A1 | 1/2002 | Shaked |
| 2002/0032769 | A1 | 3/2002 | Barkai et al. |
| 2002/0032775 | A1 | 3/2002 | Venkataramaiah et al. |
| 2002/0032871 | A1 | 3/2002 | Malan |
| 2002/0038320 | A1 | 3/2002 | Brook |
| 2002/0051080 | A1 | 5/2002 | Tanaka |
| 2002/0052719 | A1 | 5/2002 | Alexander |
| 2002/0069143 | A1 | 6/2002 | Cepeda |
| 2002/0072956 | A1 | 6/2002 | Willems |
| 2002/0078068 | A1 | 6/2002 | Krishnaprasad |
| 2002/0078382 | A1 | 6/2002 | Sheikh |
| 2002/0143927 | A1 | 10/2002 | Maltz |
| 2002/0161863 | A1 | 10/2002 | McGuire |
| 2002/0169858 | A1 | 11/2002 | Bellinger |
| 2002/0171762 | A1 | 11/2002 | Maxson et al. |
| 2002/0173997 | A1 | 11/2002 | Menard |
| 2002/0174091 | A1 | 11/2002 | Froyd et al. |
| 2002/0191619 | A1 | 12/2002 | Shafer |
| 2002/0194289 | A1 | 12/2002 | Engel |
| 2002/0198974 | A1 | 12/2002 | Shafer |
| 2003/0016685 | A1 | 1/2003 | Berggreen |
| 2003/0018702 | A1 | 1/2003 | Broughton |
| 2003/0018765 | A1 | 1/2003 | Muhlestein |
| 2003/0033589 | A1 | 2/2003 | Reyna et al. |
| 2003/0037040 | A1 | 2/2003 | Beadles et al. |
| 2003/0048287 | A1 | 3/2003 | Little et al. |
| 2003/0061312 | A1 | 3/2003 | Bodner |
| 2003/0065919 | A1 | 4/2003 | Albert |
| 2003/0084009 | A1 | 5/2003 | Bigus |
| 2003/0135508 | A1 | 7/2003 | Chorafakis et al. |
| 2003/0135547 | A1 | 7/2003 | Kent |
| 2003/0158894 | A1 | 8/2003 | Ziserman |
| 2003/0187964 | A1 | 10/2003 | Sage |
| 2003/0200459 | A1 | 10/2003 | Seeman |
| 2004/0001493 | A1 | 1/2004 | Cloonan |
| 2004/0015592 | A1 | 1/2004 | Selgas |
| 2004/0024736 | A1 | 2/2004 | Sakamoto |
| 2004/0078695 | A1 | 4/2004 | Bowers et al. |
| 2004/0225865 | A1 | 11/2004 | Cox et al. |

FOREIGN PATENT DOCUMENTS

| | | |
|---|---|---|
| EP | 745929 A1 | 12/1996 |
| EP | 0 810 755 A2 | 12/1997 |
| EP | 0 762 281 A3 | 3/1999 |
| EP | 0952521 A2 | 10/1999 |
| EP | 0 973 296 A2 | 1/2000 |
| EP | 0 993 725 A1 | 4/2000 |
| EP | 1 011 230 A2 | 6/2000 |
| EP | 1 012 726 A1 | 6/2000 |
| EP | 1 026 867 A2 | 8/2000 |
| EP | 1 047 226 A2 | 10/2000 |
| EP | 1 090 492 A1 | 4/2001 |
| EP | 1 091 526 A2 | 4/2001 |
| GB | 2 368 692 A | 5/2002 |
| JP | 8139757 A | 5/1996 |
| WO | WO 95/08794 | 3/1995 |
| WO | WO 95/24802 A | 9/1995 |
| WO | WO 98/18235 A | 4/1998 |
| WO | WO 98/24208 | 6/1998 |
| WO | WO 99/01968 | 1/1999 |
| WO | WO 99/11003 | 3/1999 |
| WO | WO 99/67931 | 12/1999 |
| WO | WO 00/04665 | 1/2000 |
| WO | WO 00/41091 | 7/2000 |
| WO | WO 01/01293 A2 | 1/2001 |
| WO | WO 01/01293 A2 | 1/2001 |
| WO | WO 01/19031 A1 | 3/2001 |
| WO | WO 01/47185 A2 | 6/2001 |
| WO | WO 01/47186 A2 | 6/2001 |
| WO | WO 02/47332 A2 | 6/2002 |

OTHER PUBLICATIONS

ISM Customer—Aware™ Query; CoManage Corporation; As of Dec. 5, 2000 (2 pages).
ISM Customer—Aware™ Provisioning; CoManage Corporation; As of Dec. 5, 2000 (2 pages).
ISM Customer—Aware™ Deep Discovery™; CoManage Corporation; As of Dec. 5, 2000 (2 pages).
ISM Customer—Aware™ Service Profiling; CoManage Corporation; As of Dec. 5, 2000 (2 pages).
ISM Customer—Aware™ Fault and Performance Management; CoManage Corporation; As of Dec. 5, 2000 (2 pages).
Strassner, John: Technology Series—*Directory Enabled Networks*, 1999; MacMillan Technical Publishing USA.
"FFST/2 Generic Alert Router for LAN and SNA Transports," IBM Technical Disclosure Bulletin, IBM Corp. New York, US, vol. 34, No. 11, Apr. 1, 1992, pp. 467-468, XP000303331, ISSN: 0018-8689.
Torrente S et al: "Implementation of the ANSI T1M1.5 GBM-T1.214 within an ODBMS framework" Networking: Foundation for the Future, San Francisco, Mar. 28-Apr. 1, 1993, Proceedings of the Annual Joint Conference of the Computer and Communications Societies (INFOCOM), Los Alamitos, IEE Comp. Soc. Press, US, vol. 2 Conf. 12, Mar. 28, 1993, pp. 875-884, XP010032227, ISBN: 0-8186-3580-0.
Kennedy T W: "Network Operations & Management Tool Requirements for the 90s" Proceedings of the Network Operations and Management Symposium (NOMS). Memphis, Apr. 6-9, 1992, New York, IEEE, U.S. Vo. 1, 1992, pp. 122-132.
Lee, W.C. et al: "Routing Subject to Quality of Service Constraints in Integrated Communication Networks" IEEE Network, IEEE Inc. New York, US, vol. 9, No. 4, Jul. 1, 1995, pp. 46-55, XP000526591, ISSN: 0890-8044 the whole document.
Williams R: "Web Based Enterprise Management W101" DMTF 1999 Annual Conference, Online! Jun. 15-16, 1999, pp. 1-21.
Wolfson, Ouri et al.: "Managing Communication Networks by Monitoring Databases", IEEE Transactions on Software Engineering, IEEE Inc. New York, US, vol. 17, No. 9 Sep. 1, 1991, pp. 944-953.
PCT/US 01/45668—International Search Report dated Oct. 16, 2002.
PCT/US 01/45669—International Search Report dated Oct. 16, 2002.
PCT/US 01/45671—International Search Report dated Oct. 16, 2002.
PCT/US 01/45670—International Search Report dated Dec. 20, 2002.
PCT/US 01/45672—International Search Report dated Apr. 14, 2003.
PCT/US 01/45671—Written Opinion dated Dec. 13, 2002.
Lonvick, C. The BSD syslog Protocol. RFC 3164 [online], Aug. 2001 [retrieved on Mar. 25, 2002]. Retrieved from the Internet, <url: HTTP://www.ietf.org/rfc/rfc3164.txt>.
Case, J., A Simple Network Management Protocol (SNMP). RFC 1098 [online], Apr. 1989 [retrieved on Mar. 26, 2002]. Retrieved from the internet <URL: http://www.ietf.org/rfc/rfc1098.txt?number=1098>.
Postel, J.B. Simple Mail Transfer Protocol. RFC 821 [online], Aug. 1982 [retrieved on Mar. 26, 2002]. Retrieved from the Internet <URL: http:///www.ietf.org/rfc/rfc0821.txt?number=821>.
Finseth, C. An Access Control Protocol, Sometimes called TACACS. RFC 1492 [online], Jul. 1993 [retrieved on Mar. 25, 2002]. Retrieved from the Internet <URL: http://www.cis.ohio-state.edu/cgi-bin/rfc/rfc1492.html>.
Anderson, B.A. TACACS User Identification Telnet Option. RFC 927 [online], Dec. 1984 [retrieved on Mar. 25, 2002]. Retrieved from the Internet <URL: http://www.ietf.org/rfc/rfc0927.txt>.
Rigney, C., et al. Remote Authentication Dial in User Service (RADIUS). RFC 2138 [online], Apr. 1997 {retrieved on Mar. 25, 2002]. Retrieved from the Internet <URL: http://www.ietf.org/rfc/rfc2138.txt>.

Rigney, C., RADIUS Accounting. RFC 2139 [online], Apr. 1997 [retrieved on Mar. 25, 2002]. Retrieved from the Internet <URL: http://www.ietf.org/rfc/rfc2139.txt>.

Postel, J., and Reynolds, J. Telnet Protocol Specification. RFC 854 [online], May 1983 [retrieved on Mar. 25, 2002]. Retrieved from the Internet <URL: http://www.ietf.org/rfc/rfc0854.txt>.

Gold Wire Technology, "Tracking Changes." In *Formulator 1.0 User Guide*, pp. 211-224.

Lewis, L., "*Policy-Based Configuration Management: A Perspective from a Network Management Vendor*," http://www.simple-times.org./pub/simple-times/issues/8-1.html., pp. 7-27.

Waldbusser, ST., et al., "Policy Based Management MIB," http://www.ietf.org/internet-drafts/draft-ietf-snmpconf-pm-05.txt, pp. 1-102.

Strassner, J., *A New Paradigm for Network Management: Business Deriven Device Management*, [online], 2002, http://www.ssgrr.it/en/ssgrr2002s/papers.htm, http://www.ssgrr.it/en/ssgrr2002s/papers/162.pdf.

NOMS, IEEE 1992 Network Operations and Management Symposium, 1992, vol. 1, IEEE Communications Society, New York, USA.

HP OpenView for Windows Workgroup Node Manager User Guide, 3COM, Jan. 1997, Part No. 09-1114-000, Hewlett-Packard Co., Santa Clara, CA USA.

Administrator's Guide, Formulator 3.0, 2000-2002, Gold Wire Technology Inc.

User Guide, Formulator 1.0, 2000-2001, Gold Wire Technology Inc.

Superstack II Hub TR Network Management Module Installation Guide, 3COM Jan. 1997, Hewlett-Packard Co., Santa Clara, CA USA.

Initially Configuring the ATM Switch Router, Cisco, Oct. 19, 2000, pp. 1-42.

Common Information Model—A Developer's Perspecti ve, IEEE, 1998, p. 1.

Liu, Stephen, Cisco IOS Command Line Interface Tutorial, 1997, Small/Medium Business Solutions, www.cisco.com/warp/cpropub/45/tutorial.htm.

Yeong et al., Lightweight Directory Access Protocol, RFC 1487, Jul. 1993.

* cited by examiner

METHOD AND APPARATUS FOR PROTECTING A NETWORK FROM ATTACK

RELATED APPLICATIONS

The following commonly owned and assigned patent applications are hereby incorporated by reference in their entirety:

patent application Ser. No. 09/730,864, entitled System and Method for Configuration, Management and Monitoring of Network Resources, filed on Dec. 6, 2000;

patent application Ser. No. 09/730,680, entitled System and Method for Redirecting Data Generated by Network Devices, filed on Dec. 6, 2000;

patent application Ser. No. 09/730,863, entitled Event Manager for Network Operating System, filed on Dec. 6, 2000;

patent application Ser. No. 09/730,671, entitled Dynamic Configuration of Network Devices to Enable Data Transfers, filed on Dec. 6, 2000;

patent application Ser. No. 09/730,682, entitled Network Operating System Data Directory, filed on Dec. 6, 2000.

patent application Ser. No. 09/799,579, entitled Global GUI Interface for Network OS, filed on Jul. 2, 2001;

patent application Ser. No. 09/942,834, entitled System and Method for Generating a Configuration Schema, filed on Aug. 29, 2001;

patent application Ser. No. 09/942,833, entitled System and Method for Modeling a Network Device's Configuration, filed on Aug. 29, 2001; and patent application Ser. No. 09/991,764, entitled System and Method for Generating a Representation of a Configuration Schema, filed on Nov. 26, 2001.

FIELD OF THE INVENTION

The present invention relates generally to network systems. More particularly, but not by way of limitation, the present invention relates to systems and methods for configuration, management and monitoring of network resources such as routers, optical devices and the like.

BACKGROUND OF THE INVENTION

With the ever-increasing reliance upon electronic data, businesses are becoming more and more reliant upon those networks responsible for distributing that data. Unfortunately, the rapid growth in the amount of data consumed by businesses has outpaced the development and growth of certain necessary network infrastructure components. One reason that the development and growth of the network infrastructure has lagged behind centers on the present difficulty in expanding, configuring, and reconfiguring existing networks. Even the most routine network expansions and reconfigurations, for example, require significant, highly technical, manual intervention by trained network administrators. Unfortunately, these highly trained network administrators are in extremely short supply. Thus, many needed network expansions and reconfigurations are delayed or even completely avoided because of the inability to find the needed administrators to perform the required laborious, technical tasks.

The present difficulty in configuring and reconfiguring networks is best illustrated by an example directed toward installing a single new router on an existing network. To install a new router (such as router 100 or 105 in FIG. 1), an administrator 110 first would need to choose a particular router with the best attributes for the network. The basic configuration of the new router generally will be defined by its manufacturer and its model. Although it would seem that the router should be chosen based upon its attributes, administrators 110 often choose a router based upon the identity of its manufacturer and the administrator's ability to configure devices from that manufacturer. Administrators 110, for example, may only know how to configure and operate devices manufactured by Cisco Systems, Inc. and may overlook equal or even superior devices from other manufacturers merely because they cannot configure them.

After the administrator 110 has chosen the desired router (router 105, for example), the administrator 110 generally will order the router 105 from the manufacturer and have it shipped, not necessarily to the installation site, but rather to the administrator's site where a basic configuration can be installed. The administrator 110 then ships the router 105 to the installation site where it can be physically installed. After the router 105 has been physically installed, the administrator 110 typically is manually notified, e.g., by telephone, that the router 105 is connected to the network. The administrator must then create the device-specific commands required to fully configure the router 105 and transfer those commands to the router's memory 115. After the administrator 110 verifies that the device-specific commands were installed correctly, the router 105 can be brought online.

Obviously, the steps required for an administrator to configure a single router are quite cumbersome and require significant technical skill. The problem, however, is even more severe when the administrator desires to simultaneously configure or reconfigure several network devices. First, the administrator, for example, would need to manually identify the network devices that need to be configured or reconfigured. For example, if the administrator desired to turn up service between two points, the administrator would need to identify the routers along the path between the two points. The administrator would then need to verify that the policies and rules established for the network permit the contemplated reconfiguration for those devices. Assuming that the reconfiguration is within the network's policies and rules, the administrator would need to create the device-specific code required to reconfigure each of the identified devices. In many instances, the same device-specific code cannot be used on all of the devices. For example, the device-specific commands required to reconfigure a Cisco™ router differ significantly from the device-specific commands required to reconfigure a Juniper™ router. Thus, if the identified network devices include both Cisco™ and Juniper™ routers, the administrator would be required to create different versions of the device-specific commands, thereby significantly increasing the chance for error in the reconfiguration process.

Once the device-specific commands have been created for each of the identified network devices, the commands must be manually transmitted to each device. That is, a connection, e.g., a telnet connection, must be established to each device and the particular commands transferred thereto. After each device has received its commands, the network administrator must manually reconnect to each device and verify that the device received the proper commands and that it is operating properly.

Although some tools have been developed to help administrators perform certain ones of the laborious tasks of network management, these tools are extremely limited in their application. For example, CiscoWorks™ is a group of unrelated tools that can aid administrators in some enterprise level tasks. CiscoWorks™ and similar tools provide singularly focused, unrelated tools to perform activities such as quality of service (QOS) provisioning and network policy management. These tools do not provide a way to interrelate the various happenings in a network. In essence, these present network tools lack a holistic approach to network administration.

Moreover, tools like CiscoWorks™ are generally dedicated to the management of one type of network device, e.g., router or optical device, and one brand of network device. For example, CiscoWorks™ does not help an administrator configure a Juniper™ router, and it does not help an administrator configure optical devices. Thus, if the network has both Cisco™ and Juniper™ devices, multiple unrelated tools must be utilized to perform basic network management tasks. Unfortunately, because these multiple unrelated tools are so difficult to manage, network administrators are prone to select routers based upon manufacturer identity rather than upon device features.

In addition to several other drawbacks, these singularly focused network tools result in substandard fault detection and recovery. For example, in present systems, once a configuration is changed, there is no easy way to "back out" of that configuration if a problem arises. Presently, if a new configuration for a target device fails, the network administrator would be forced to recreate the device-specific commands of the target device's previous configuration, manually connect to the device and then transmit the recreated device-specific commands to the device. As can be appreciated, this process can be extremely time consuming and error prone.

Moreover, the present state of network technology leaves networks and network devices vulnerable to attacks. For example, most routers only require two levels of passwords to obtain access to the configuration information. The first password is unique to each user. The second password, however, is a general password used by everyone that needs to change the configuration of the router. As would be expected, this second password is rarely changed and, thus, presents a significant security problem.

In most networks, once an attacker has gained access to one network device, e.g., a router, the attacker has virtually free access to all other devices on the network. With this free access, an attacker could alter or erase the configurations of many network devices and thereby bring down an entire network. Because reconfiguring each network device that was attacked can take a significant amount of time, an attacker could bring down a network for a considerable length of time merely by gaining access to a single network device. Accordingly, a system and method are needed to prevent an attacker from being able to alter the configurations of network devices and to efficiently repair any configuration records that have been the subject of an attack.

Present networks are also vulnerable to attack by the attachment of unauthorized network devices. An attacker, for example, could attach a new router to a network, and to bring the router on-line, the attacker would only need to know basic information about the network layout and the network device naming methodology. Once the attacker brings a new network device on-line, he can disrupt the operation of the network. Accordingly, a method and system are needed to prevent the unauthorized addition of network resources to a network.

The lack of security for network devices makes network infrastructures extremely vulnerable to attack. Because network reliability is critical to the survival of many businesses, a system and method are needed to protect networks from attacks. Moreover, a system and method are needed to quickly reconfigure an attacked network.

SUMMARY OF THE INVENTION

To remedy the above described and other deficiencies of the current technology, a system and method for the configuration, monitoring and protection of network devices has been developed. In one embodiment, the present invention provides a system and method to configure, monitor, protect and/or manage network devices without regard to device type and/or manufacturer identity. One implementation of this embodiment includes a network manager unit disposed between the network administrator and the network devices. The network manager unit allows the administrator to holistically view, configure and manage an entire network. That is, the administrator can view, configure and manage, for example, both optical devices and/or routers without regard to manufacturer identity or specific model. The administrator can implement this holistic approach with the use of a central repository for all configuration information and/or a central posting location for all network events.

In one embodiment, for example, an administrator can configure a new device or reconfigure an existing device by logging into the network manager unit and selecting a particular network device to configure. The network manager unit can then retrieve a configuration record unique to the selected network device from the common repository and provide that record to the administrator. After receiving the record, the administrator can change fields therein without regard for manufacturer identity of the network device. Next, the network manager unit can automatically verify that the requested changes to the configuration record comply with the policies and rules established for the network, and assuming that the changes do not violate any of the policies or rules, the network manager unit can update and store the modified configuration record in the central repository. A copy of the old configuration record can be kept in the central repository for fault recovery, modeling and other purposes.

Once the configuration record has been changed, network manager unit can use the fields of the modified configuration record to generate the actual device-specific commands needed to configure the selected network device. For example, the fields in the configuration record can be used to populate variable fields in a device-specific code template. In such an embodiment, the administrator is not required to know or create the actual device-specific commands that are required to configure the selected network device. Instead, the administrator only needs to know the general objective such as "enable router." The network manager unit will transform this general objective into the actual device-specific commands.

After the network manager unit has created the device-specific commands to match the altered configuration record, these commands are automatically pushed to the selected network device and stored in memory therein. A copy of those commands is also stored in association with the configuration record. Finally, after the new device-specific commands have been pushed to the selected network device, the network manager unit can verify the proper installation and operation of the new configuration information.

In essence, one embodiment of the present invention allows a configuration record to be created and/or modified for each network device regardless of the device's type, manufacturer or model. Each of the configuration records can be stored in a central repository for simplified access, retrieval and editing. Thus, to change the configuration for any network device, the network manager unit need only retrieve the altered configuration record from the central repository, generate the device-specific commands based upon that configuration record and push those generated device-specific commands to the target network device.

In another aspect, the present invention can provide security features both for network devices and network infrastructures. For example, any new device connected to an existing network can be required to authenticate itself to a network manager unit. Additionally, a network device can be required to authenticate the origin of any configuration commands that it receives. For example, the network device could be required to decrypt any received configuration commands using a key. If an attacker does not have a corresponding key to encrypt the configuration commands, then he will not be able to generate any new configuration commands that the network device will accept. In those cases where network security is breached, the present invention allows for the rapid reconfiguration of those network devices that were attacked. For example, an old, clean configuration record for each of the attacked network devices can be retrieved from a central repository and used to reconfigure the attacked devices.

As can be appreciated by those skilled in the art, the present invention addresses the significant shortfalls in present network technology. In particular, the present invention, provides a system and method for protecting a network from attack and returning an attacked network to a known, clean state. These and other advantages of the present invention are described more fully herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
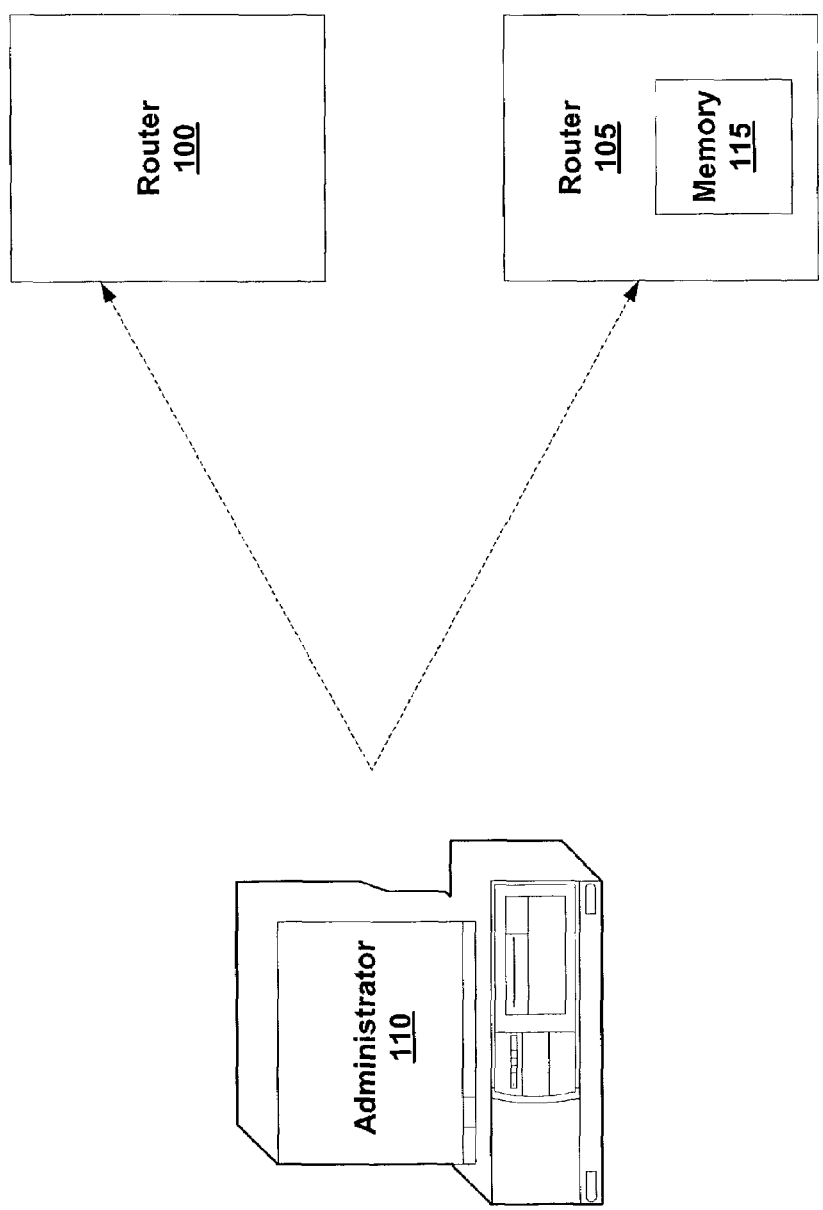
FIG. 1 illustrates a present system for configuring network routers.

Although the present invention is open to various modifications and alternative constructions, a preferred exemplary embodiment that is shown in the drawings is described herein in detail. It is to be understood, however, that there is no intention to limit the invention to the particular forms disclosed. One skilled in the art can recognize that there are numerous modifications, equivalents and alternative constructions that fall within the spirit and scope of the invention as expressed in the claims.

Figure 2:
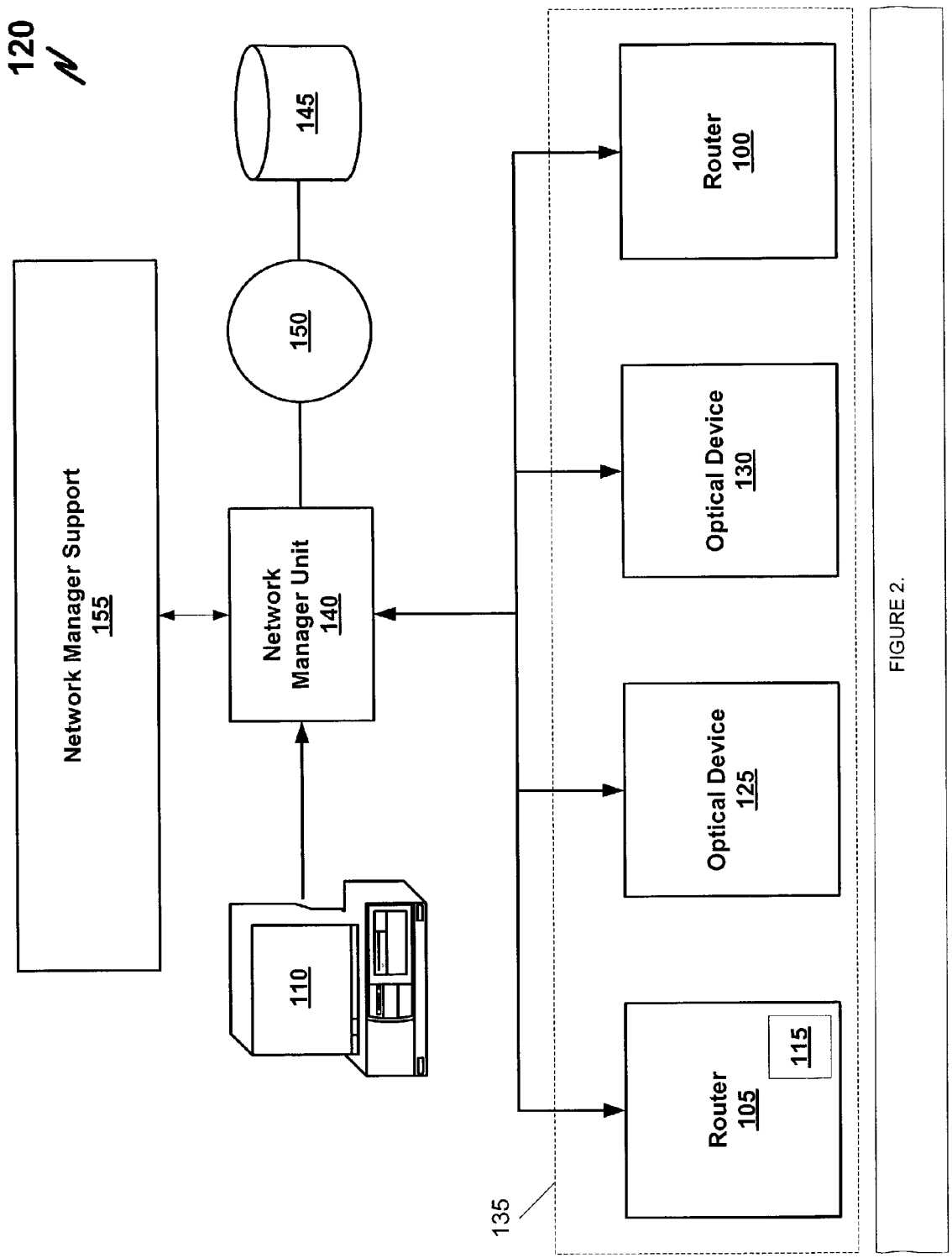
FIG. 2 illustrates a system for configuring network devices in accordance with the principles of the present invention.

Referring now to FIG. 2, there is illustrated a system 120 for configuring network devices 100, 105, 125, 130 (collectively 135) in accordance with the principles of the present invention. This embodiment includes a network manager unit 140 disposed between the administrator 110 and the network devices 135, which can include routers, optical devices, etc. The network manager unit 140 also is connected to remote storage 145 (connected by network 150) and a network manager support 155.

To alter the configuration of a network device, such as network device 135, or to add a network device to an existing network, the administrator 110 can access the network manager unit 140, search for and retrieve the configuration record corresponding to a target network device, and through a series of interactive, wizard-like screens, change the configuration record for the target network device. This altered configuration record is stored in a central repository in the network manager unit 140 and can be checked against network policies accessible by the network manager unit 140. Next, the network manager unit 140 can generate device-specific commands from the new configuration record and push those device-specific commands to the target network device or have the target network device pull the commands. Finally, the network manager unit 140 can verify that the new configuration was installed correctly at the target network device.

To generate the necessary device-specific commands, the network manager unit 140 may access the remote storage device 145 that can contain the various templates needed to generate device-specific commands for different types, brands and/or models of network devices. Each of these templates can contain variable fields corresponding to either information stored in the configuration records or information input directly by the administrator. The network manager unit 140 generates the device-specific commands by retrieving the appropriate template and filling in the variable fields with the data from the configuration records and/or data input directly by the administrator 110. Once generated, these device-specific commands can be stored in the configuration record and/or they can be stored in the remote storage device 145 with an appropriate pointer stored in the configuration record.

In other embodiments, the network manager unit 140 can be used to verify the identity of any network device. For example, the network device 135 could provide a digital certificate or some other type of secure identifier to the network manager unit 140 (and if needed, to a certificate authority 157). The network manager unit 140 (or a security manager) could then verify the identity of the network device 135 and verify that the network device is authorized to be configured by the network manager unit 140. For example, the network manager unit 140 could retrieve a public key from the centrally stored configuration record associated with the network device 135 and use that public key to verify the authenticity of the received digital certificate.

In one embodiment, the network device 135 is loaded with encrypted information, e.g., a digital certificate, at the device manufacturer. The key needed for encryption need not necessarily reside on the network device 135. Rather, only the output generated by using the key can be stored on the network device 135. Thus, any private keys are not jeopardized by being widely distributed. Other embodiments, however, use a secure microcontroller and/or a secure memory device that prevent the extraction of a key stored at the network device 135.

Accordingly, the present invention provides, in one embodiment, that when the network device 135 is initially connected to a network, it can retrieve an initial contact address from internal storage, contact the network manager unit 140 at that initial contact address and provide it with a digital certificate. The network manager unit 140 (or certificate authority 157) can then verify the authenticity of the digital certificate and record an appropriate indication in that device's configuration record. Notably, a key for verifying the authenticity of a digital certificate could be stored in association with the device's configuration record.

In alternate embodiments, the network device may be loaded with security algorithms at the manufacturer or may include secure microcontrollers that include embedded security algorithms. When a network device 135 is connected to the network, the network device 135 can send a message to the network manager unit 140. The network manager unit 140 can then send a seed, e.g., a random number, to the network device 135. The network device 135 can use this seed along with other identifying information as an input to the security algorithm. The output from the algorithm can be sent back to the network manager unit 140 where it can be verified.

In yet another embodiment, prior to accepting configuration commands, a network device 135 can require that the party providing the new commands authenticate itself. Thus, prior to sending new configuration commands, the network manager unit 140 could retrieve, for example, a key from the device's configuration record, generate a digital certificate using that key, and transmit that digital certificate to the network device 135.

Alternatively, the network manager unit 140 could encrypt all of the configuration commands using, for example, the network device's public key and transmit the encrypted configuration commands to the network device 135. The key used to encrypt the configuration commands can be stored in the configuration record associated with the network device 135. Thus, different network devices can be associated with different keys. Additionally, the network device 135 would need to include a private key for decrypting such an encrypted configuration record. As those of skill in the art can understand, however, other security measures such as digital signatures can be employed to protect the security of the network.

If network security is compromised, it is important that any impacted network devices 135 be quickly restored to a working condition. Generally, attacks are directed at individual network devices 135. That is, the configurations of individual network devices 135 are altered or erased. Because the network manager unit 140 can centrally store the previous configuration records for each network device 135, the present invention allows for those records to be retrieved and provided to attacked network devices 135. Even if hundreds of network devices 135 are attacked, the network manager unit 140 can retrieve prior, clean configuration records from the central repository (e.g., the directory 165 shown in FIG. 3) and generate new configuration instructions for the attacked network devices 135. These new, clean configuration instructions can then be installed on the appropriate network devices thereby returning the network devices to a known, clean state.

As can be appreciated by those skilled in the art, the network manager unit 140 can be implemented on virtually any hardware system. Good results, however, have been achieved using components running the Red Hat™ LINUX Operating System and the Sun Solaris™ UNIX Operating System. In embodiments running either of these operating systems, the network manager unit 140 is configured to utilize the common services provided by that particular operating system.

Figure 3:
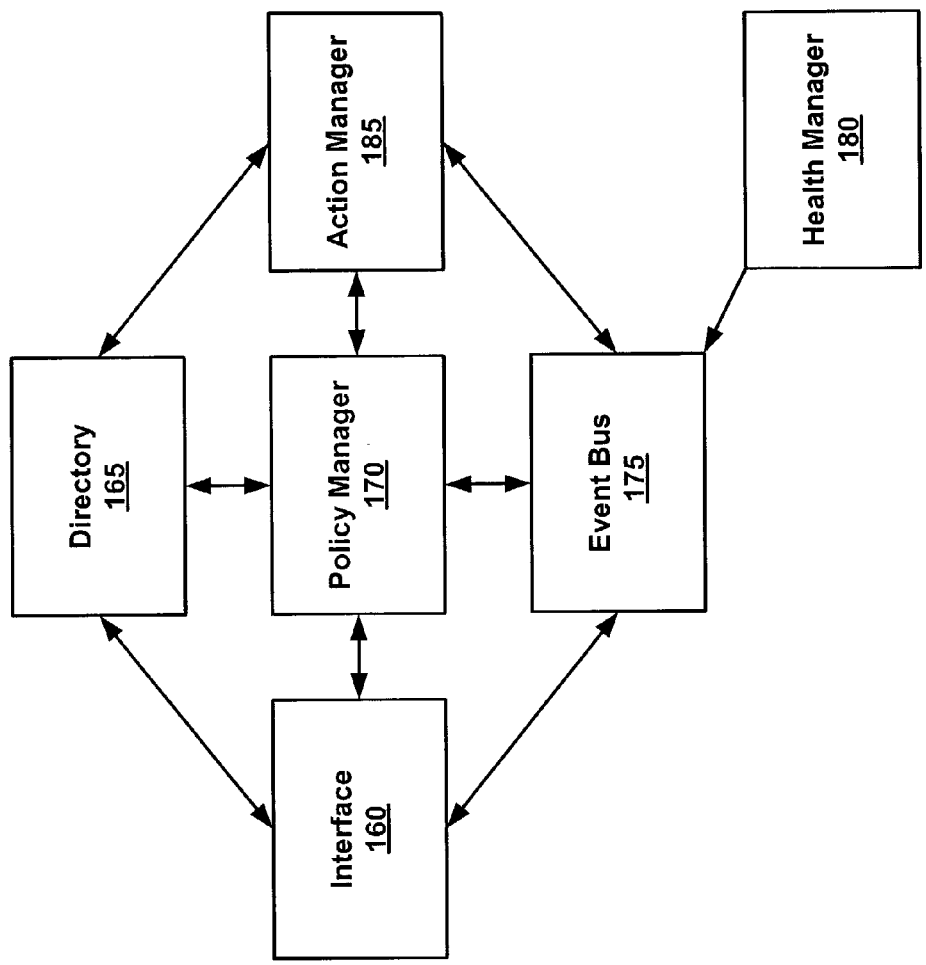
FIG. 3 illustrates in more detail the network manager unit shown in FIG. 2.

Referring now to FIG. 3, there is illustrated in more detail the network manager unit 140 shown in FIG. 2. This embodiment of the network manager unit 140 includes six basic modules: an interface 160, a directory 165, a policy manager 170, an event bus 175, a health manager 180 and an action manager 185. The illustrated connections between the various components are exemplary only. The components can be connected in a variety of ways without changing the basic operation of the system. Although the division of the network manager unit 140 into the six components is the presently preferred embodiment, the functions of these components could be subdivided, grouped together, deleted and/or supplemented so that more or less components can be utilized in any particular implementation. Thus, the network manager unit 140 can be embodied in several forms other than the one illustrated in FIG. 3.

Referring first to the interface module 160, it is designed to exchange data with the administrator 110 (shown in FIG. 2) and, in some embodiments, with the network devices 135 (also shown in FIG. 2). Although the interface 160 could implement virtually any type of interface, good results have been achieved using a graphical, web interface. Other interfaces can be based upon wireless protocols such as WAP (wireless application protocol).

The second component of the network manager unit 140 is the event bus 175. The event bus 175 includes a central posting location for receiving messages relating to network events. For example, when a configuration for a network device 135 is to be changed, an appropriate message can be published (or otherwise made available) to the event bus 175. Similarly, if a network condition such as an error occurs, an appropriate message can be published to the event bus 175. Notably, any message published to the event bus 175 can also be sent to the administrator 110 by way of the interface 160. The administrator 110, however, does not necessarily need to respond to a received message for the event to be addressed by the network manager unit 140.

To determine the proper response for a message posted to the event bus 175, the received message can be compared against the policies stored in the policy manager 170, which is a repository for the business and network policies and rules used to manage the network. By using these rules and policies, an administrator 110 (shown in FIG. 2) can define a response for any event published to the event bus 175. The defined response can be virtually anything including reconfiguring a network device, shutting down a network device and notifying an administrator.

In operation, the policy manager 170 can read a message posted to the event bus 175. Alternatively, the event bus 175 can automatically push the message to the policy manager 170. Either way, however, the policy manager 170 uses the message to access the policy records that can be stored, for example, in a look-up table and to correlate the message to the appropriate response. Once the policy manager 170 has determined the appropriate response, that response is published to the event bus 175 as a work order that can be read by the action manager 185 and subsequently executed. That is, the action manager 185 can read the work order from the event bus 175 and perform the necessary tasks to complete that work order. In other embodiments, the work order can be sent directly to the action manager 185. For example, assume that the action manager 185 reads a work order from the event bus 175 that indicates two routers—one a Cisco™ router and one a Juniper™ router—need to be enabled. The action manager 185 can locate each of these routers and determine the device-specific code needed to enable them. The code required to enable the Cisco™ router, for example, might be "enable_router" and the code required to enable the Juniper™ router might be "router_enable." Because the action manager 185 determines the appropriate device-specific code, however, the administrator 110 (shown in FIG. 2) only needs to generically indicate that both devices are to be enabled. The administrator 110 does not need to know the actual device-specific code required by each router.

In other embodiments, the action manager 185 can verify that the administrator 110 (shown in FIG. 2) has authority to make changes to network devices without authorization from additional parties. If additional authorization is required, the action manager 185 can post an appropriate message to the event bus 175.

Still referring to FIG. 3, the directory 165 of the network manager unit 140 includes a central repository for storing the configuration records of each of the network devices connected to the network manager unit 140. For example, the directory 165 could store a separate configuration record for each of network devices 100, 105, 125 and 130 shown in FIG. 2. In certain embodiments, several interconnected directories may be utilized, and in such systems, each directory can store a certain subset of the configuration records or a complete copy of all of the configuration records. Generally, such embodiments would employ multiple linked network manager units 140, and in the embodiment where complete copies of the configuration records are stored in different directories, synchronization techniques can be used to guarantee data integrity.

The configuration records stored in the directory 165 are searchable by way of the interface 160. That is, the administrator 110 or a component within the network manager 140 (shown in FIG. 2) can initiate a search through the interface 160 and the results of that search can be made available to the administrator 110 through the interface 160. Moreover, the configuration records can be searched in any of a variety of ways. For example, the configuration records can be searched according to equipment type (e.g., routers, optical devices, etc.), device type (edge router, core router, etc.), device location, device manufacturer, device model, device name, operational status, etc.

Referring now to the health manager 180, it can be configured to monitor the overall health of the network and/or the health of individual network devices 135 (shown in FIG. 2) within the network. The health manager 180 can operate in an active mode and/or a passive mode. In the active mode, the health manager actively polls at least some of the network devices 135 about their status, utilization, congestion, etc. In the passive mode, the various network devices 135 automatically report to the health manager 180. In either embodiment, however, the health manager 180 can collect individual device information and model overall network health. Additionally, the health manager 180 can publish messages regarding network device problems, projected network device problems, network problems, and/or projected network problems. The policy manager 170 can then determine the appropriate course of action to take for the particular message and the action manager 185 can implement that response.

In further embodiments, the health manager can monitor the health of the network manager components. For example, the health manager can monitor the operation of the event bus, the action manager and/or the directory. Moreover, the health manager can monitor the flow of data between the various components of the network manager.

Figure 4:
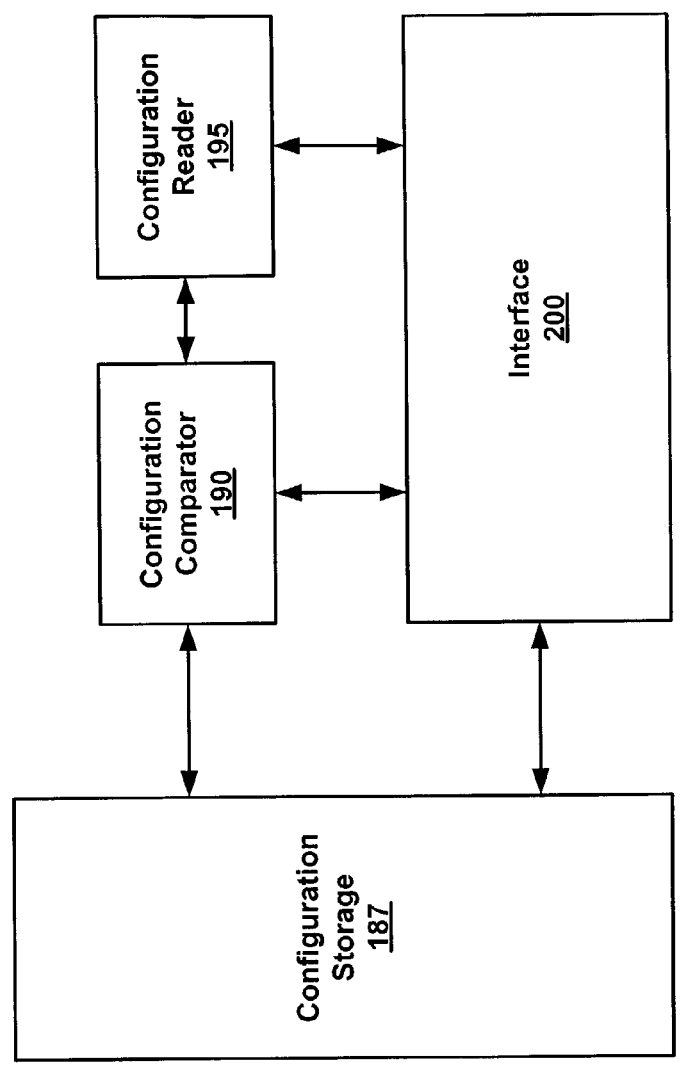
FIG. 4 illustrates in more detail the directory element shown in FIG. 3.

Referring now to FIG. 4, there is illustrated in more detail the directory 165 shown in FIG. 3. This embodiment of the directory 165 consists of four interconnected modules: configuration storage 187, configuration comparator 190, configuration reader 195 and interface 200. The directory 165, however, does not need all of the modules to function in accordance with the principles of the present invention.

The configuration reader module 195 of the directory 165 is designed to initiate communication with (or directly communicate with) a target network device and retrieve that device's actual configuration. For example, the configuration reader can retrieve the actual configuration from the memory 115 of router 105 (shown in FIG. 2). This retrieved actual configuration can then be passed to the configuration comparator 190. The configuration reader 195 can also retrieve the intended configuration of the target device from the configuration storage 187 and pass that intended configuration to the configuration comparator 190. The configuration comparator 190 can then compare the actual configuration and the intended configuration and present the differences to the administrator 110 (shown in FIG. 2). In one embodiment, the differences in the configurations are not only presented literally, but also in a natural language summary form. Once the differences have been identified, they can be used to identify a failed configuration installation and/or to aid the administrator in creating the proper configuration for a device.

As previously discussed, the configuration storage 187 is designed to store configuration records corresponding to network devices such as network devices 135 shown in FIG. 2. In one embodiment the configuration storage 187 is designed not only to store the present configuration record for a network device, but also to store previous configuration records for that device. By storing these previous configurations, fault recovery and correction are vastly improved over present systems because prior, successful configurations can be quickly retrieved and used to replace new, faulty configurations. For example, a prior configuration of a previously known good state can be retrieved and installed on the associated network device. This prior configuration could be days old or even weeks old. Prior configuration records can be distinguished by version numbers and/or a time stamp. Additionally, each configuration record can include a searchable summary that includes notes on the configuration and why that configuration was modified.

Figure 5:
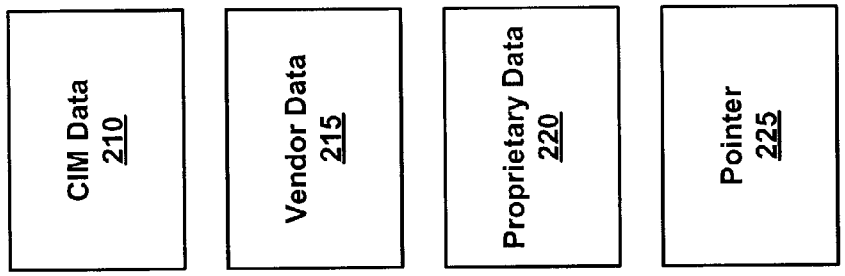
FIG. 5 illustrates a configuration record for a typical network device in accordance with the present invention.

Referring now to FIG. 5, there is illustrated a configuration record 205 for a typical network device. This configuration record 205 is divided into four portions: a common information model ("CIM") data portion 210, a vendor data portion 215, proprietary data portion 220 and a data pointer 225. The CIM data portion 210 contains data relating to the physical attributes of a particular network device such as name, device type, number of interfaces, capacity, etc. The CIM data items are defined in the CIM Specification v2.2 and the CIM Schema v2.4, both of which are well known in the art and incorporated herein by reference.

The vendor data portion 215 of the configuration record contains standard vendor-specific data regarding the particular network device. For example, the vendor data portion 215 could indicate which version of an operating system that the network device is running or which features of the device are enabled. Generally, the data in the vendor data portion 215 is specific to each manufacturer and even to each model of network device.

The proprietary data portion 220 of the configuration record can contain data used by the network manager unit in configuring and managing the network devices. In one embodiment, for example, the proprietary data portion 220 includes a pointer to an address at which a core dump for a network device is stored. That is, if a router initiates a core dump, the location of that core dump could be recorded in the proprietary data portion 220 of the configuration record for that router. In other embodiments, the proprietary data portion 220 can store version numbers, time stamps, health records for a particular configuration, configuration summary data, configuration notes, etc.

The pointer portion 225 of the configuration record 205 can be used to point to a storage location where the actual device-specific commands for the associated network device are stored. Similarly, the pointer 225 could be configured to point to a storage location for a device-specific template for configuring a newly installed network device. In other embodiments, the pointer portion 225 of the configuration record can be supplemented or replaced with a storage location for actual device-specific code.

Figure 6:
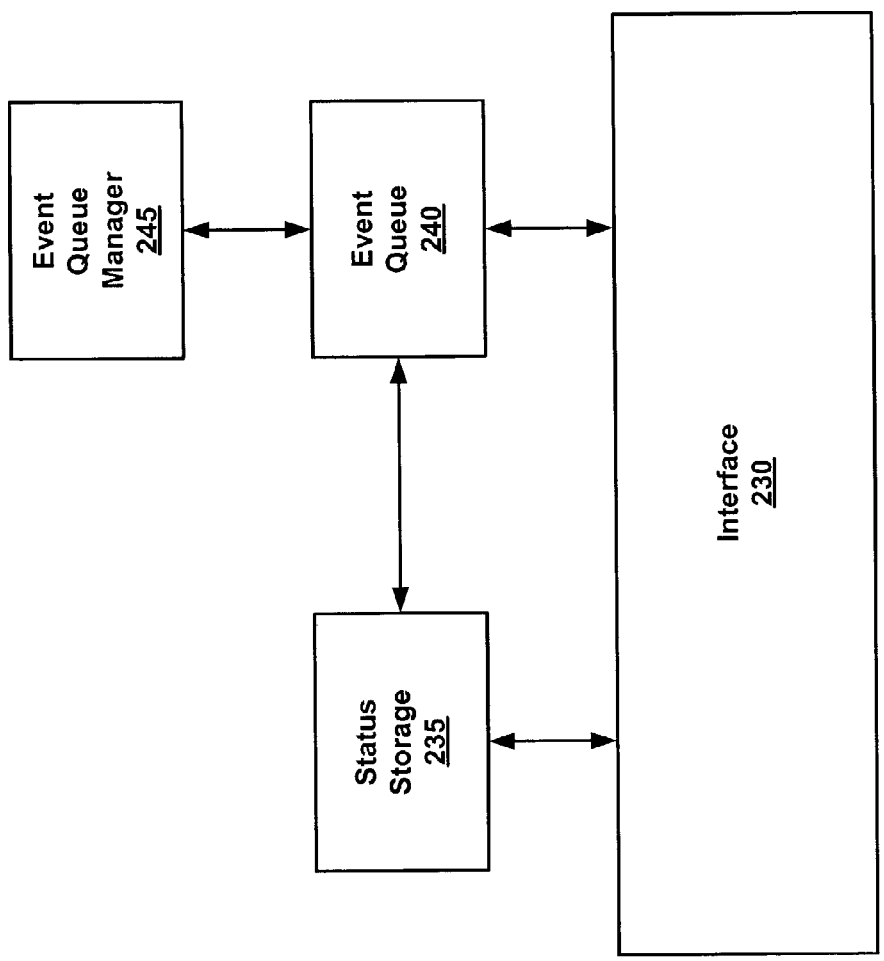
FIG. 6 illustrates in more detail the event bus shown in FIG. 3.

Referring now to FIG. 6, there is illustrated in more detail the event bus 175 shown in FIG. 3. As previously described, the event bus 175 is a posting location for messages relating to network events. Network devices as well as the other components of the network manager unit 140 (shown in FIG. 2) can address and post events to the event bus 175.

The particular embodiment of the event bus 175 shown in FIG. 6 is comprised of four basic modules: an interface 230, a status storage 235, an event queue 240, and an event queue manager 245. In operation, a message indicating the occurrence of a network event is posted to the event queue 240 by way of the interface 230. The messages stored at the event queue 240 are then made available to the policy manager 170 (shown in FIG. 3), so that a proper response can be determined. If the posted message is a work order from the policy manager 170, the work order is made available to the action manager 185 (shown in FIG. 3) for subsequent implementation.

In one embodiment of the event bus 175, an event message is stored in status storage 235 along with a status field and an age field. Thus, for any message posted to the event bus 175, its status and age can be continuously monitored. (The event bus 175 can also get messages from client devices.) For example, status storage 235 could indicate that the status for a particular event is pending in the action manager 185 (shown in FIG. 3), awaiting proper authorization, completed, stalled, etc. As the status changes from one status to another, appropriate messages can be generated and posted at the event queue 240. For example, if the status of an event changes from pending to stalled, an appropriate message can be posted to the event queue 240 so that the policy manager 170 can determine how to respond. Similarly, if the age field in the status storage 235 indicates that a particular network event has not been addressed within a predetermined amount of time, that event can be requeued, deleted from the event queue 240, or a new event notification indicating the delay can be generated and placed on the event queue 240.

Figure 7:
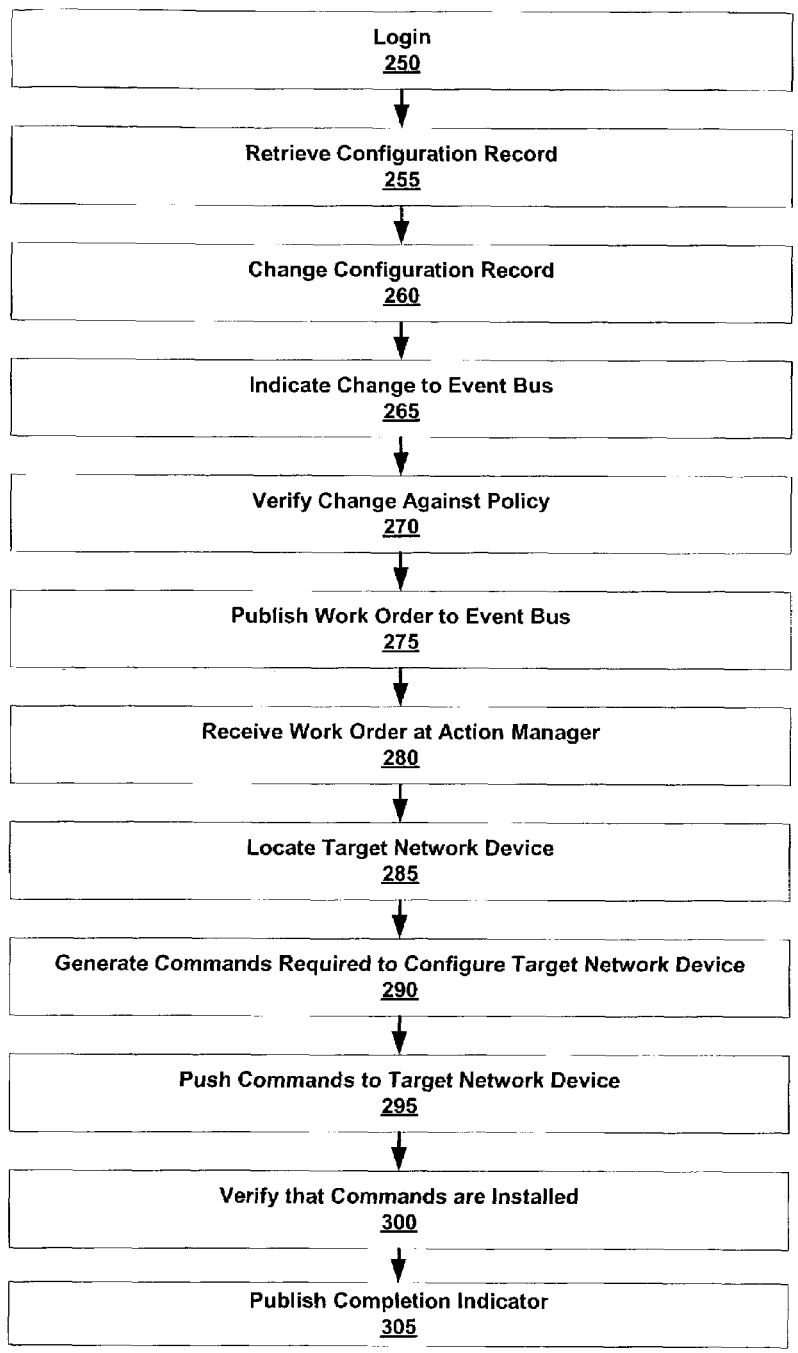
FIG. 7 is a flow chart of a method for configuring a network device in accordance with the present invention.

Referring now to FIG. 7, there is a flow chart of one method for configuring or reconfiguring a network device in accordance with the principles of the present invention. In this embodiment, the administrator 110 (shown in FIG. 2) initially logs in to the network manager unit 140 (Step 250). Through a series of graphical interfaces, the administrator 110 can select a network device that needs to be configured or reconfigured. The configuration record associated with the selected device can then be retrieved from the directory 165 (shown in FIG. 3) and presented to the administrator (Step 255). If no configuration record is available for a selected device, the administrator 110 will be guided through a series of steps to build the configuration for that device. Otherwise, the administrator 110 can change parameters within the configuration record of the selected device and save those altered configuration records within the directory 165 (Step 260). Notably, even though the configuration record for the selected network device has been changed, the actual configuration of the device has not been changed. Before the configuration of the device can be changed, an event message indicating that a configuration record has been altered should be published to the event bus 175 (shown in FIG. 3) (Step 265). The policy manager 170 (shown in FIG. 3) then receives the event message, either by reading it from the event bus 175 or by receiving it from the event bus 175, and determines if the configuration change is authorized (Step 270). If the configuration change is within the network rules and the administrator 110 (shown in FIG. 2) is authorized to make the change, a work order is published to the event bus (Step 280). The action manager 185 (shown in FIG. 3) can then read the work order from the event bus 175 and carry out the necessary steps to implement the work order (Step 280).

In one embodiment, the action manager 185 (shown in FIG. 3) carries out the work order by locating the target network device, retrieving the appropriate configuration record from the directory 165 (shown in FIG. 3), generating the device-specific code corresponding to the altered configuration (Step 290), and pushing the device-specific code to the target network device (Step 295). The action manager 185 can also store the device-specific code in a remote storage device, such as remote storage device 145 shown in FIG. 2, and a pointer to the remote storage device can be recorded in the configuration record. Finally, the action manager 185 can verify that the device-specific code was properly transferred to the selected network device and that the network device is behaving accordingly (Step 300). Assuming that the device-specific codes were installed correctly and that the network device is operating properly, a completion message is published to the event bus 175 (shown in FIG. 3) (Step 305).

In conclusion, the present system provides, among other things, a method and apparatus to protect a network from attack and return an attacked network to a known, clean state. Those skilled in the art, however, can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for initializing a network device, the method comprising the steps of:

retrieving an initial communication address from a local memory of the network device;

transmitting a secure identifier to the initial communications address, the secure identifier identifying the network device;

verifying the authenticity of the secure identifier;

retrieving a configuration record from a configuration record repository, the configuration record indicating which features of the network device are to be enabled, and the configuration record repository including at least one separate configuration record for each of a plurality of network devices, each of the at least one separate configuration records enabling a corresponding one of the plurality of network devices to be reconfigured in the event an attacker alters configurations of the plurality of network devices, the retrieved configuration record being associated with the network device that corresponds to the secure identifier, each of the plurality of network devices being capable of having multiple configuration records, wherein each of the multiple configuration records for each of the plurality of network devices represents different configurations at different time frames;

receiving at least an indication of the configuration record at the network device; and installing the at least an indication of the configuration record at the network device.

2. The method of claim 1, further comprising the step of:

loading the network device with the initial communications address.

3. The method of claim 1, further comprising:

loading the network device with the secure identifier.

4. The method of claim 1, further comprising the step of:

reading a key stored on the network device; and generating the secure identifier using the record key.

5. The method of claim 1, wherein the secure identifier comprises:

a digital certificate.

6. The method of claim 1, wherein the step of verifying comprises the step of:

retrieving a key from the configuration record that was retrieved from the configuration record repository, wherein the key is associated with the network device.

7. The method of claim 1, wherein the secure identifier is a first secure identifier, the method further comprising the steps of:

receiving a second secure identifier from a network management unit;

verifying the authenticity of the received second secure identifier; and responsive to verifying the authenticity of the second secure identifier, accepting configuration instructions for installation.

* * * * *